United States Patent
Yamamoto (12) 
(10) Patent No.: US 6,887,444 B1
(45) Date of Patent: May 3, 2005

(54) EXHAUST GAS PURIFYING CATALYST (75) Inventor: Shinji Yamamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 112 days.

(21) Appl. No.: 09/856,369

(22) PCT Filed: Nov. 21, 2000

(86) PCT No.: PCT/JP00/08180

§ 371 (c)(1),
(2), (4) Date: May 21, 2001

(87) PCT Pub. No.: WO01/37978

PCT Pub. Date: May 31, 2001

(30) Foreign Application Priority Data

Nov. 26, 1999 (JP) .............................. 11-336839
Nov. 9, 2000 (JP) ..................... 2002-342550

(51) Int. Cl.$^7$ ............................................... B01J 29/06
(52) U.S. Cl. ........................ 423/239.2; 502/65; 502/64; 502/66; 502/71; 502/73; 502/74; 502/77; 502/79
(58) Field of Search ............................... 502/64, 65, 66, 502/71, 73, 74, 77, 78, 79

(56) References Cited

U.S. PATENT DOCUMENTS

| | | | |
|---|---|---|---|
| 5,164,350 A | * | 11/1992 | Abe et al. ..................... 502/66 |
| 5,473,887 A | | 12/1995 | Takeshima et al. ........... 60/276 |
| 5,676,912 A | | 10/1997 | Sharma et al. ............ 423/213.2 |
| 6,047,544 A | * | 4/2000 | Yamamoto et al. ........... 60/285 |

FOREIGN PATENT DOCUMENTS

| | | | |
|---|---|---|---|
| EP | 0 002 791 | | 7/1979 |
| EP | 0 782 880 | | 7/1997 |
| EP | 0 852 966 | | 7/1998 |
| EP | 0 904 827 | * | 3/1999 |
| JP | 58-20307 | | 4/1983 |
| JP | 08-010566 A | | 1/1996 |
| JP | 2600492 | | 1/1997 |
| JP | 10-225636 A | | 8/1998 |

* cited by examiner

*Primary Examiner*—Christina Johnson
(74) *Attorney, Agent, or Firm*—Foley & Lardner LLP (57) ABSTRACT

An exhaust gas purifying catalyst for purifying exhaust gas discharged from an automotive internal combustion engine. The exhaust gas purifying catalyst comprises a monolithic substrate. A HC adsorbing layer for adsorbing hydrocarbons (HC) is formed on the monolithic substrate. The HC absorbing layer contains zeolite. A catalytic layer for producing hydrogen ($H_2$) and reducing NOx is formed on the HC adsorbing layer. The catalytic layer functions to produce hydrogen ($H_2$) from at least one of hydrocarbons and carbon monoxide (CO) and to reduce nitrogen oxides (NOx) with the produced hydrogen and at least one of hydrocarbons and carbon monoxide in exhaust gas.

15 Claims, 6 Drawing Sheets

EXHAUST GAS PURIFYING CATALYST

FIELD OF THE INVENTION

This invention relates to improvements in an exhaust gas purifying catalyst, and more particularly to improvements in an exhaust gas purifying catalyst for effectively reducing nitrogen oxides in an oxygen-excessive exhaust gas.

BACKGROUND TECHNIQUE

Hitherto catalysts for simultaneously oxidizing carbon monoxide (CO) and hydrocarbons (HC) and reducing nitrogen oxides (NOx) have been extensively used as exhaust gas purifying catalysts installed to internal combustion engines of automotive vehicles and the like. A typical example of these catalysts is disclosed in Japanese Patent Publication No. 58-20307, in which an alumina coat layer is formed on a refractory substrate and contains noble metals such as Pd, Pt and/or Rh and additionally contains, as assistant catalyst, oxides of rare earth metal such as Ce and/or La and/or of base metal such as Ni, if necessary.

However, such a catalyst is largely affected by an exhaust gas temperature and a set air-fuel ratio of the engine, and therefore cannot reduce NOx particularly when exhaust gas of the engine is oxygen-excessive (i.e., has an air-fuel ratio leaner than stoichiometric value). In this regard, Japanese Patent No. 2600429 discloses a so-called rich spike process as a method of reducing NOx when exhaust gas of the engine is oxygen-excessive, using a NOx reducing catalyst for promoting reduction reaction of NOx. In this method, NOx is trapped when exhaust gas takes an oxygen-excessive or lean atmosphere (having the air-fuel ration leaner than the stoichiometric value), and then the trapped NOx is released and reduced by temporarily lowering an oxygen concentration of exhaust gas so that exhaust gas takes exhaust gas takes a rich atmosphere (having the air-fuel ratio richer than the stoichiometric value).

DISCLOSURE OF THE INVENTION

Drawbacks have been encountered in the above NOx reducing method using the rich spike process, as set forth below. That is, the NOx reducing method requires to periodically lowering the oxygen concentration in exhaust gas in an engine operating region in which exhaust gas takes the oxygen-excessive atmosphere. Additionally, in order to make reduction reaction of NOx under a condition where the oxygen concentration has been lowered, it is required to supply a large amount of HC and CO as reducing agents. This makes it impossible to obtain fuel economy improvement effect due to vehicle running on oxygen-excessive air-fuel mixture having an air-fuel ratio leaner than the stoichiometric value. Additionally, in the above NOx reducing method, the catalyst contains a large amount of alkali metal and alkaline earth metal for the purpose of trapping NOx in the oxygen-excessive atmosphere of exhaust gas, and therefore a catalytic activity (for oxidation) of platinum and rhodium cannot be sufficiently exhibited when exhaust gas is low in temperature. Furthermore, in order to sufficiently oxidize or remove HC and CO components which have not been consumed under NOx reduction reaction, it is required to oxidize or remove the components by making oxidation reaction on the NOx reducing catalyst, or otherwise by a three-way catalyst disposed downstream of the NOx reducing catalyst for reducing NOx.

However, such the NOx reducing catalyst or the three-way catalyst disposed downstream of the NOx reducing catalyst are located considerably far from the engine, and therefore the temperature of exhaust gas flown to the catalysts are unavoidably lowered, thereby making it impossible to exhibit a sufficient oxidizing performance for HC and CO. Particularly immediately after engine starting, sufficient oxidation of HC and CO is difficult to be made. Additionally, when HC and CO components in exhaust gas are increased to lower an oxygen concentration in exhaust gas and to reduce NOx as discussed above, it is impossible to make vehicle running under lean-burn operation, thereby exhibiting an insufficient fuel economy improvement effect.

It is, therefore, an object of the present invention is to provide an improved exhaust gas purifying catalyst which can effectively overcome drawbacks encountered in conventional techniques for reducing NOx in exhaust gas.

Another object of the present invention is to provide an improved exhaust gas purifying catalyst which can effectively remove NOx, HC and CO from exhaust gas while obtaining a high ID fuel economy improvement effect.

A further object of the present invention is to provide an improved exhaust gas purifying catalyst for an internal combustion engine, which can remove NOx in exhaust gas at a high efficiency by using hydrogen ($H_2$) as reducing agent and effectively remove HC and CO particularly during a low temperature engine operation immediately after engine starting, while obtaining a high fuel economy improvement effect upon making lean-burn operation of the engine.

An aspect of the present invention resides in an exhaust gas purifying catalyst comprising a monolithic substrate. A HC adsorbing layer for adsorbing hydrocarbons (HC) is formed on the monolithic substrate. A catalytic layer for producing hydrogen ($H_2$) and reducing NOx is formed on the HC adsorbing layer. The catalytic layer functions to produce hydrogen ($H_2$) from at least one of hydrocarbons and carbon monoxide (CO) and to reduce nitrogen oxides (NOx) with the produced hydrogen and at least one of hydrocarbons and carbon monoxide in exhaust gas.

Another aspect of the present invention resides in an exhaust gas purifying system for an internal combustion engine. The exhaust gas purifying system comprises an exhaust gas purifying catalyst including a monolithic substrate. A HC adsorbing layer for adsorbing hydrocarbons (HC) is formed on the monolithic substrate. A catalytic layer for producing hydrogen ($H_2$) and reducing NOx is formed on the HC adsorbing layer. The catalytic layer functions to produce hydrogen ($H_2$) from at least one of hydrocarbons and carbon monoxide (CO) and to reduce nitrogen oxides (NOx) with the produced hydrogen and at least one of hydrocarbons and carbon monoxide in exhaust gas. A device is provided to control combustion in the engine to produce exhaust gas, to be brought into contact with the catalytic layer, having a composition meeting a relation [(a concentration of hydrogen/a concentration of total reducing components)$\geq 0.3$].

A further aspect of the present invention resides in a method of producing an exhaust gas purifying catalyst. The method comprises (a) preparing a monolithic substrate; (b) forming a HC adsorbing layer on the monolithic layer, to adsorb hydrocarbons (HC); and (c) forming a catalytic layer on the HC adsorbing layer, to produce hydrogen ($H_2$) and reduce NOx, the catalytic layer functioning to produce hydrogen ($H_2$) from at least one of hydrocarbons and carbon monoxide (CO) and to reduce nitrogen oxides (NOx) with the produced hydrogen and at least one of hydrocarbons and carbon monoxide in exhaust gas.

THE BEST MODE FOR CARRYING OUT THE INVENTION

According to the present invention, an exhaust gas purifying catalyst comprises a monolithic substrate. A HC adsorbing layer for adsorbing hydrocarbons (HC) is formed on the monolithic substrate. A catalytic layer for producing hydrogen ($H_2$) and reducing NOx is formed on the HC adsorbing layer. The catalytic layer functions to produce hydrogen ($H_2$) from at least one of hydrocarbons and carbon monoxide (CO) and to reduce nitrogen oxides (NOx) with the produced hydrogen and at least one of hydrocarbons and carbon monoxide in exhaust gas.

The HC adsorbing layer preferably contains zeolite (HC adsorbing material) capable of adsorbing hydrocarbons, as a main component. In case that the exhaust gas purifying catalyst is for an internal combustion engine, for example, of an automotive vehicle, the HC adsorbing layer can adsorb HC during a cold operation of the engine, i.e., when the catalyst has been still at a low temperature immediately after engine starting, and release HC during a warm-up operation of the engine, i.e., when the catalyst is at a temperature within a range of from 100 to 300° C. It will be understood that cold stage and warm-up stages of the catalyst are respectively during the cold operation and the warm-up operation of the engine.

The catalytic layer for producing $H_2$ and reducing NOx functions to produce hydrogen ($H_2$) from hydrocarbons released from the HC adsorbing layer under reforming reactions of HO and CO as discussed below. Additionally, the catalytic layer functions also to produce hydrogen ($H_2$) from hydrocarbons and/or carbon monoxide in exhaust gas discharged from the engine during a steady state engine operation. Hydrogen ($H_2$) thus produced can effectively react with NOx, serving as reducing agent.

It is to noted that reactivity of hydrogen with NOx is high, and therefore it is assumed that NOx emitted from the engine can be effectively reduced even during the warm-up stage of from a time immediately after the engine starting to a time making lean-burn operation of the engine although the NOx reducing catalyst component contained in the catalytic layer has not been sufficiently raised in temperature and sufficiently activated. In the lean-burn operation, the engine is supplied mainly with air-fuel mixture having an air-fuel ratio leaner than a stoichiometric value, thereby discharging exhaust gas (or oxygen-excessive atmosphere) having an air-fuel ratio leaner than a stochiometric value.

The above HC and CO reforming reactions carried out in the catalytic layer is divided in general into reforming reaction of HC and steam reforming reaction of CO. The HC reforming reaction is assumed to be represented by the following reaction formulae (1) and (2):

$$HC+O_2 \rightarrow HC(O)+CO+CO_2+H_2 \qquad (1)$$

$$HC+H_2O \rightarrow HC(O)+CO+CO_2+H_2 \qquad (2)$$

where HC(O) indicates HC produced under the reforming reaction of HC.

The CO steam reforming reaction is assumed to be represented by the following reaction formula (3):

$$CO+H_2O \rightarrow CO_2+H_2 \qquad (3)$$

The catalytic layer contains a $H_2$ producing catalyst component for functioning to produce hydrocarbons, and a NOx reducing catalyst component for functioning to reduce nitrogen oxides. The $H_2$ producing catalyst component is disposed on the HC adsorbing layer and including a HC reforming catalyst component functioning to reform hydrocarbons so as to produce hydrogen, and a CO reforming catalyst component functioning to make steam reforming of carbon monoxide. The HC reforming catalyst component preferably contains cerium oxide carrying palladium. The CO reforming catalyst component preferably contains zirconium oxide carrying rhodium.

Preferably, the HC reforming catalyst component forms a first layer disposed on the monolithic substrate, and the CO reforming catalyst forms a second layer, in which the second layer is formed on the first layer, so that the catalytic layer takes a multiple layer structure. Otherwise, the HC reforming catalyst component and the CO reforming catalyst are mixed to form a single layer disposed on the monolithic substrate on the HC adsorbing layer, so that the catalytic layer takes a single layer structure. Otherwise, the HC reforming catalyst component forms a first layer disposed on the monolithic substrate, and the CO reforming catalyst component forms a second layer, in which the second layer is formed downstream of the first layer relative to flow direction of exhaust gas.

Figure 1:
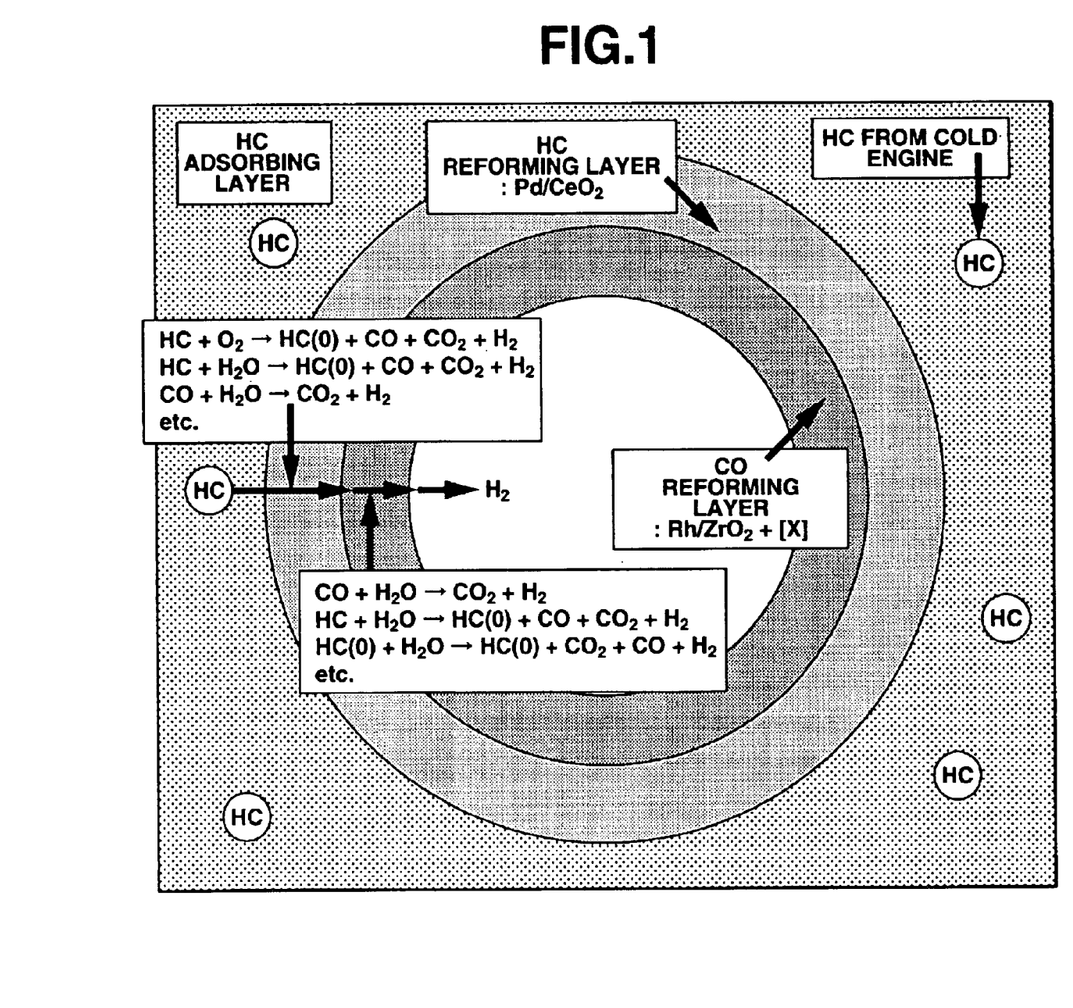
FIG. 1 is a fragmentary transverse sectional view of an example of an exhaust gas purifying catalyst according to the present invention, showing a coat layer structure defining a cell through which exhaust gas flows, and functions of respective layers in the structure.

As shown in FIG. 1, HC adsorbed in the HC adsorbing layer immediately after engine starting and released from the HC adsorbing layer at the warm-up stage of the catalyst is first subjected to partial oxidation in the HC reforming layer so that HC is converted into partial oxide (HC(O) corresponding to partially oxidized HC), CO and $H_2$. Then, the partial oxide, CO and $H_2$ are converted into $H_2$ in the CO reforming layer. As a result, even at the catalyst warm-up stage, $H_2$ is produced under reforming of HC and CO, and therefore NOx can be reduced. Additionally, during an engine operating-range accomplishing the lean-burn operation, $H_2$ is supplied in the catalytic layer, thereby reducing NOx after completion of the catalyst warm-up. It will be understood that the HC reforming layer and the CO reforming layer may be arranged side by side (or located respectively on the upstream and downstream sides) in a direction of flow of exhaust gas since it is sufficient that HC released from the HC adsorbing layer undergoes first the HC reforming reactions, and subsequently the CO steam reforming reaction.

Additionally, in order to produce $H_2$ under reforming of HC, it is preferable that the above-discussed HC reforming layer contains cerium oxide carrying Pd. In order to produce Hz under steam reforming of CO, it is preferable that the above-discussed CO reforming layer contains zirconium oxide carrying Rd. By virtue of these noble metals and oxides contained, reactions represented by the following formulae (4), (5) and (6) are assumed to be mainly carried out in the HC reforming layer when exhaust gas is introduced or passed into the exhaust gas purifying catalyst of the present invention:

$$HC + O_2 \rightarrow HC(O) + CO + CO_2 + H_2 \quad (4)$$

$$HC + H_2O \rightarrow HC(O) + CO + CO_2 + H_2 \quad (5)$$

$$CO + H_2O \rightarrow CO_2 + H_2 \quad (6); \text{ and}$$

Additionally, reactions represented by the following formulae (5), (6) and (7) are assumed to be mainly carried out in the CO reforming layer when exhaust gas is introduced or passed into the exhaust gas purifying catalyst of the present invention:

$$CO + H_2O \rightarrow CO_2 + H_2 \quad (6)$$

$$HC + H_2O \rightarrow HC(O) + CO + CO_2 + H_2 \quad (5)$$

$$HC(O) + H_2O \rightarrow H(CO) + CO_2 + CO + H_2 \quad (7)$$

As a result of the above reactions, $H_2$ is produced while exhaust gas components, particularly HC and CO are oxidized to be removed.

Further, the catalytic layer for producing $H_2$ and reducing NOx contains not only the catalyst components for producing $H_2$ but also the catalyst components for reducing NOx. Thus, even with such a single catalyst, $H_2$ serving as the reducing agent for NOx can be produced while effectively reducing NOx.

Furthermore, in order to further promote production of $H_2$ from HC and CO in exhaust gas even after the engine warm-up stage, it is preferable that an upstream section of the catalytic layer for producing $H_2$ and reducing NOx is replaced with a catalytic (upstream) layer containing alumina carrying Pd. The upstream section is located at an upstream side with respect to flow of exhaust gas discharged from the engine. More specifically, such a preferable mode is as follows: A HC partial oxidation or reforming layer containing alumina carrying Pd is formed on the upstream side or section of the HC adsorbing layer while the HC reforming layer containing cerium oxide carrying Pd and the CO reforming layer containing zirconium oxide carrying Pd are formed on a downstream side or section of the HC adsorbing layer.

Figure 2:
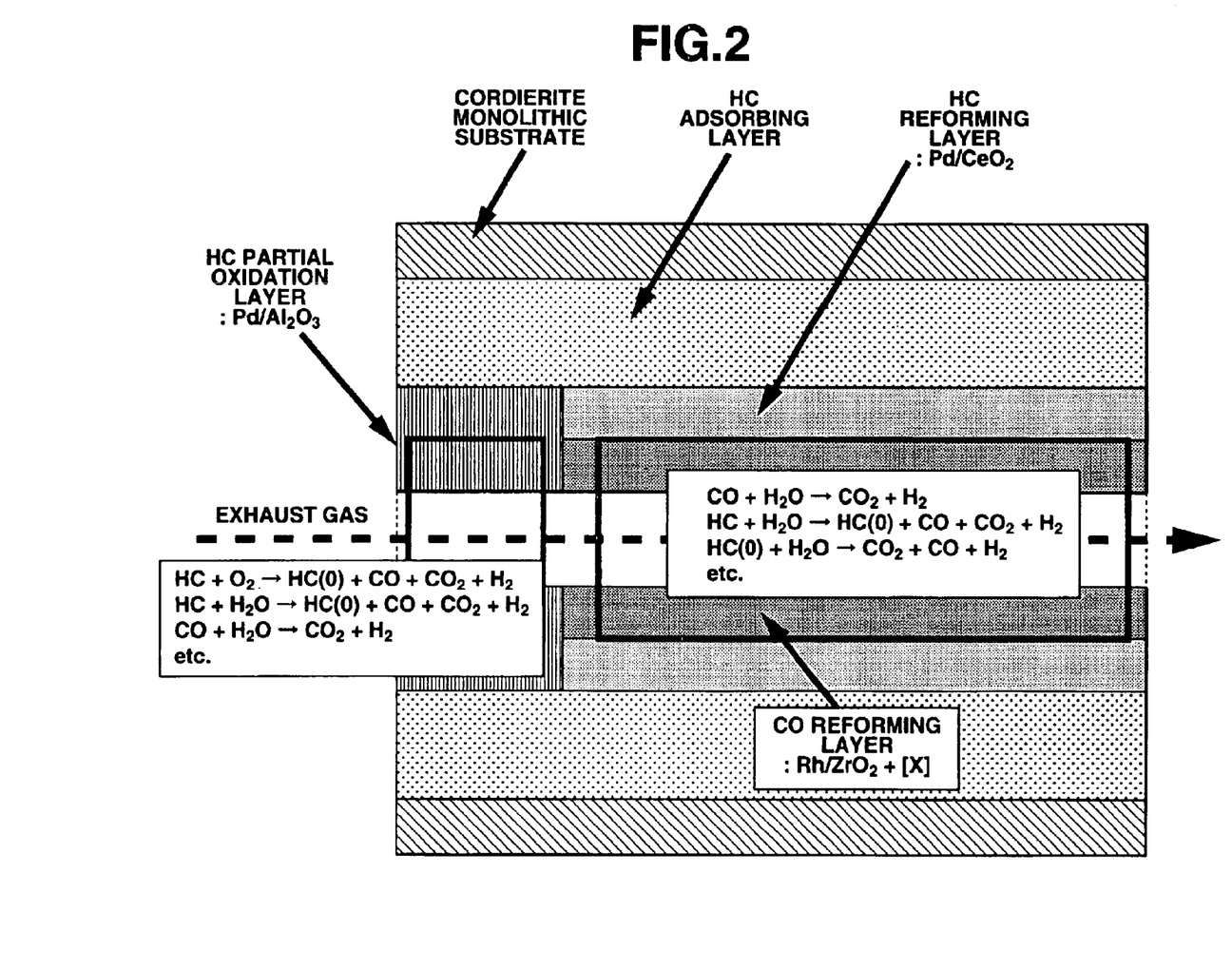
FIG. 2 is a fragmentary longitudinal sectional view of another example of an exhaust gas purifying catalyst according to the present invention, showing a coat layer structure defining a cell through which exhaust gas flows, and functions of respective layers in the structure.

An example of this preferable mode is shown in FIG. 2; however, the exhaust gas purifying catalyst of the present invention is not limited to this example. In the example of FIG. 2, the CO reforming layer is formed on the HC reforming layer on the downstream side or section of the HC adsorbing layer. Additionally, the HC partial oxidation layer on the upstream side or section of the HC adsorbing layer is in contact with the HC reforming layer and the CO reforming layer on the downstream side or section of the HC adsorbing layer. In the exhaust gas purifying catalyst as shown in FIG. 2, after the warm-up stage of the catalyst, it is assumed that the HC partial oxidation layer (containing alumina carrying Pd) on the upstream side or section converts HC contained in exhaust gas into HC(O) and CO under partial oxidation; then the HC reforming layer promotes production of $H_2$ under the reforming reaction of H(CO); and subsequently the CO reforming layer produces $H_2$ under steam reforming reaction of CO. Accordingly, according to this example, $H_2$ can be supplied even after completion of warm-up of the catalyst, subsequent to the warm-up stage of the catalyst. This makes it possible to reduce and remove NOx in exhaust gas having the lean air-fuel ratio or in the oxygen-excess atmosphere.

As discussed above, in operation of the exhaust gas purifying catalyst of the present invention, $H_2$ is used as the reducing agent, in place of HC and CO which have been conventionally used as reducing agent. In this connection, it is preferable that composition of exhaust gas to be brought into contact with the NOx reducing catalyst component meets a relation [(a concentration of hydrogen/a concentration of total reducing components)$\geq 0.3$]. Such exhaust gas composition meeting the above relation can be realized, for example, by controlling combustion to be made in combustion chambers of an internal combustion engine, i.e., by controlling fuel injection amount (amount of fuel injected from a fuel injector), fuel injection timing (timing at which fuel is injected from the fuel injector), spark timing (timing at which a spark plug generates spark), opening and/or closing timings of intake and/or exhaust valves.

Figure 6:
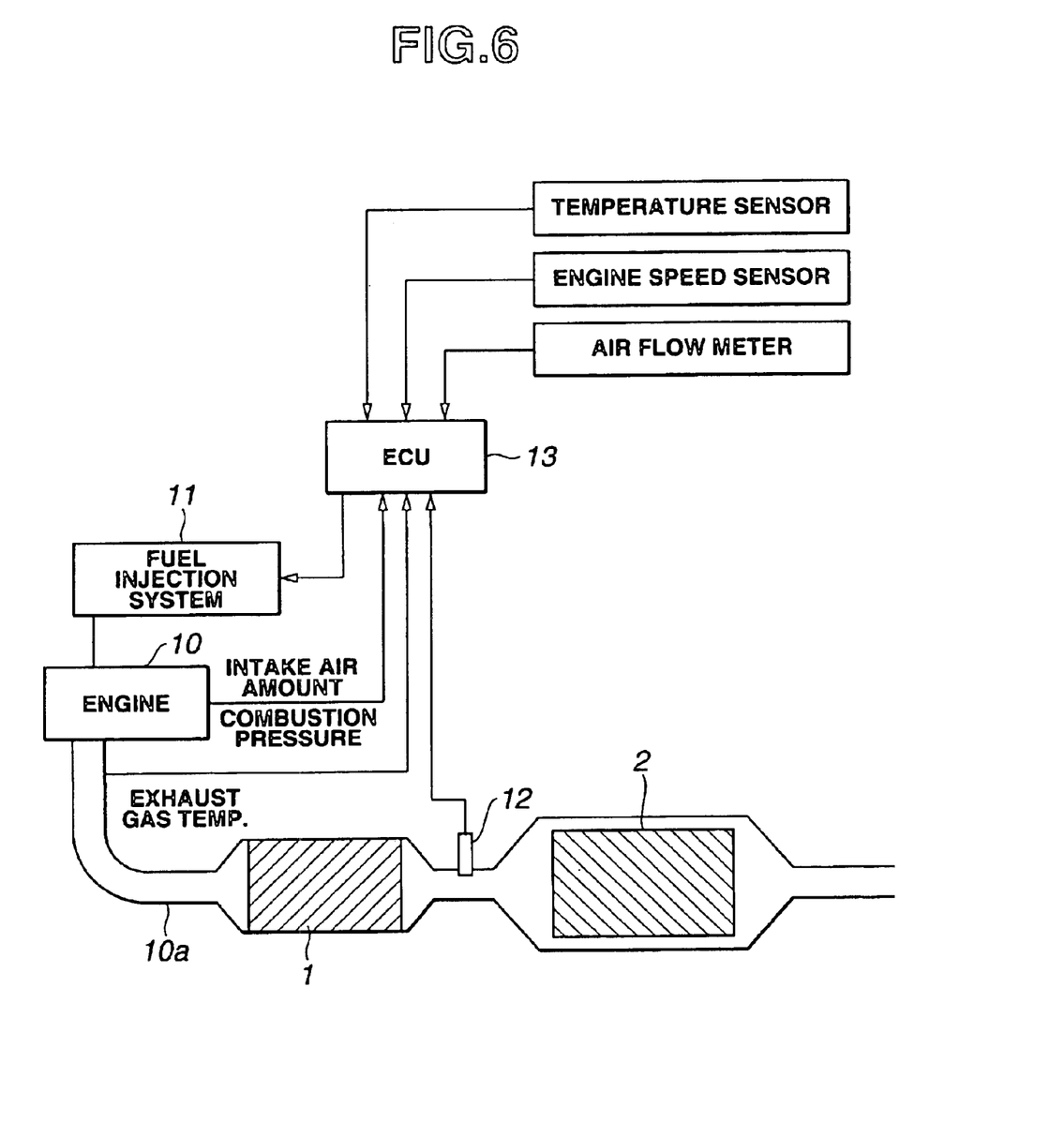
FIG. 6 is a schematic illustration of an exhaust gas purifying system (including the exhaust gas purifying catalyst according to the present invention) incorporated with an automotive internal combustion engine, the engine being used as an evaluation engine system for evaluating emission performance of the exhaust gas purifying catalysts according to the present invention.

For example, as shown in FIG. 6, the above relation in exhaust gas was accomplished by controlling the fuel injection amount and fuel injection timing of fuel to be injected from a fuel injection system 11 by control signals fed from an electronic control unit (ECU) 13. The electronic control unit 13 is arranged to be supplied with signals representative of intake air amount (amount of air to be sucked into the engine), combustion pressure (pressure within combustion chamber under combustion) and exhaust gas temperature (temperature of exhaust gas discharged from the engine), and signals of a temperature sensor for detecting, for example, temperature of engine coolant, an engine speed sensor for detecting engine speed of the engine, and an air flow sensor for detecting amount of air flowing into the engine, and an oxygen sensor 12 for detecting an oxygen concentration in an exhaust gas passageway 10a through which exhaust gas from the engine flows to be emitted to the atmosphere. In FIG. 6, a upstream-side catalyst 1 and a downstream-side catalyst 2 are disposed in the exhaust gas passageway 10a. The oxygen sensor 12 is located in the exhaust gas passageway 10a between the upstream-side and downstream-side catalysts 1, 2.

When the exhaust gas composition can meet the relation resented by the above relation, the concentration of $H_2$ in exhaust gas rises thereby obtaining a further high NOx reducing performance. In this connection, in conventional techniques, exhaust gas from automotive engines or from exhaust systems including exhaust gas purifying catalysts has a relation [(a concentration of hydrogen/a concentration of total reducing components)$<0.3$]. Consequently, the rate or concentration of $H_2$ in exhaust gas is considerably small so that it is impossible to effectively use $H_2$ as reducing component or agent.

Additionally, it is more preferable that the composition of exhaust gas to be brought into contact with the NOx reducing catalyst component meets the relation [(a concentration of hydrogen/a concentration of total reducing components) $\geq 0.5$].

In the above CO reforming layer, in order to maintain oxidizing condition of Rh suitable for CO steam reforming reaction, it is preferable that the above-mentioned zirconium oxide carrying Rd contains alkaline earth and has a composition represented by the following formula (A):

where X is an alkaline earth metal selected from the group consisting of magnesium, calcium, strontium and barium; a and b are ratios of atoms of elements; and c is a number of oxygen atoms required for satisfying valences of X and Zr, in which a is within a range of from 0.01 to 0.5, b is within a range of from 0.5 to 0.99, and a+b=1.0.

It is to be noted that the alkaline earth metal contained in the zirconium oxide makes it possible to obtain a high catalytic activity throughout a long time use (including the initial time in use).

Additionally, it is preferable that the NOx reducing catalyst component for reducing NOx is contained in at least one of the HC adsorbing layer, the catalytic layer for producing $H_2$ and reducing NOx and the upstream side catalytic layer containing alumina carrying Pd. Accordingly, Pt and/or Rh serving as the NOx reducing catalyst components may be contained in all of the HC adsorbing layer, the HC reforming layer, the CO reforming layer of the catalytic layer for producing $H_2$ and reducing NOx, and the upstream-side catalytic layer containing alumina carrying Pd. By virtue of the NOx reducing catalyst component, $H_2$ can be produced in the warm-up stage of the catalyst while NOx emitted in the catalyst warm-up stage can be effectively reduced and removed. Additionally, NOx emitted can be also effectively reduced and removed during engine operational control under supply of air-fuel mixture having lean air-fuel ratio to the engine (i.e., the oxygen-excess atmosphere).

In addition to the fact that the NOx reducing catalyst component is contained in at least one of the respective catalytic layers, it is also preferable that a further catalytic layer for reducing NOx may be formed on the catalytic layer for producing $H_2$ and reducing NOx. Otherwise, the further catalytic layer may be formed on the catalytic layer for producing $H_2$ and reducing NOx without the NOx reducing catalyst component being contained in at least one of the respective catalytic layers. Otherwise, the exhaust gas purifying catalyst of the present invention may be disposed upstream of a NOx reducing catalyst in the exhaust gas passageway through which exhaust gas discharged from the engine flows.

Furthermore, the NOx reducing catalyst component including Pd, alumina, alkali metal(s) and/or alkaline earth metal(s) may be contained in at least one of the HC adsorption layer, the HC partial oxidation layer, the CO reforming layer and/or the upstream section of the catalytic layer. By virtue of the above NOx reducing catalyst component contained in the exhaust purifying catalyst, NOx emitted from the engine can be effectively reduced and removed throughout whole engine operating regions from a time immediately after engine starting to a time accomplishing a steady state engine operation providing the oxygen-excess atmosphere.

It is preferable that the content of the above alkali metal(s) and/or alkaline earth metal(s) in the whole catalytic layer (formed on the HC adsorbing layer) is not less than 80% by weight of a total content of alkali metal(s) and alkaline earth metal(s) contained in the exhaust gas purifying catalyst. With such a content, NOx emitted from the engine can be effectively trapped by the alkali metal(s) and/or alkaline earth metal(s) in a lean region (in which exhaust gas has air-fuel ratio leaner than stoichiometric level). If the content is less than 80% by weight, a sufficient NOx trapping performance cannot be obtained.

In order to realize the above content (of 80% by weight) of alkali metal(s) and/or alkaline earth metal(s), it is preferable that the alkali metal(s) and/or alkaline earth metal(s) are used as water-insoluble compound(s) and/or slightly water-soluble compound(s).

Zeolite used in the above HC adsorbing layer is selected from known zeolites; however, it is preferable to select zeolite(s) which can exhibit a sufficient HC adsorbing performance particularly in a temperature region of from ordinary temperature to a relatively high temperature and even in an atmosphere in presence of water, and a high durability. A preferable example of such zeolites is H-type β-zeolite having a Si/2Al ratio ranging from 10 to 500; however, zeolite to be used in the HC adsorbing layer is not limited to this. If zeolite has a Si/2Al ratio smaller than 10, it cannot effectively adsorb HC because impeding HC adsorption by water coexisting in exhaust gas is considerable. If zeolite has a Si/2Al ratio larger than 500, HC adsorbing performance of zeolite may be lowered.

Furthermore, it is also preferable to select at least one of MFI, Y-type zeolite, USY-type zeolite and/or mordenite which are different from each other in diameter and structure of fine pores formed in the zeolite, and to mix the selected one(s) with the above-mentioned H-type β-zeolite so as to prepare the zeolite to be contained in the HC adsorbing layer. Such selection is made taking account of the components of exhaust gas discharged from the engine, resulting in effective adsorption of HC in the HC adsorbing layer.

It will be understood that the above H-type β-zeolite has a sufficient HC adsorption performance; however, the H-type β-zeolite may carry Pd, Mg, Ca, Sr, Ba, Ag, Y, La, Ce, Nd, P, B and/or Zr by using conventional methods such as an ion exchange method, an impregnation method or a dipping method, thereby further improving HC adsorption performance and HC release-suppression performance of the zeolite.

An example of the monolithic substrate used in the exhaust gas purifying catalyst is a honeycomb-type monolithic substrate. The honeycomb-type monolithic substrate is formed of ceramic materials such as cordierite ceramic, or may be formed of metal such as ferrite stainless steel. Otherwise, powder serving as the catalyst components may be formed into a honeycomb shape. The honeycomb-type monolithic substrate is formed with a plurality of cells which axially extend. Each cell is defined by walls which axially extend and have a thickness.

EXAMPLES

The present invention will be more readily understood with reference to the following Examples in comparison with Comparative Example; however, these Examples are intended to illustrate the invention and are not to be construed to limit the scope of the invention.

Preparation of Catalytic Powder of HC Reforming Layer

Cerium oxide ($CeO_2$) powder was impregnated with an aqueous solution of palladium (Pd) nitrate, followed by drying and firing, thereby preparing Pd-carried cerium oxide powder A whose concentration of Pd was 10% by weight.

Subsequently, powder B was prepared by repeating the same operation as that for Powder A with the exception that $Zr_{0.1}Ce_{0.9}O_2$ was used in place of $CeO_2$.

Powder C was prepared by repeating the same operation as that for Powder A with the exception that $Zr_{0.2}Ce_{0.2}O_2$ was used in place of $CeO_2$.

Powder D was prepared by repeating the same operation as that for Powder A with the exception that $Zr_{0.5}Ce_{0.5}O_2$ was used in place of $CeO_2$.

Powder E was prepared by repeating the same operation as that for Powder A with the exception that $Zr_{0.9}Ce_{0.1}O_2$ was used in place of $CeO_2$.

Powder F was prepared by repeating the same operation as that for Powder A with the exception that Powder F had a Pd concentration of 5% by weight.

Preparation of Catalytic Powder for CO Reforming Layer

Powder of $Ca_{0.2}Zr_{0.8}O_2$ was impregnated with an aqueous solution of rhodium (Rh) nitrate, followed by drying and firing, thereby preparing Rh-carried zirconium oxide powder G whose Rh concentration was 6% by weight.

Subsequently, Powder H was prepared by repeating the same operation as that for Powder G with the exception that powder of $Mg_{0.1}Zr_{0.9}O_2$ was used in place of the powder of $Ca_{0.2}Zr_{0.8}O_2$.

Powder I was prepared by repeating the same operation as that for Powder G with the exception that powder of $Ba_{0.1}Zr_{0.9}O_2$ was used in place of the powder of $Ca_{0.2}Zr_{0.8}O_2$.

Powder J was prepared by repeating the same operation as that for Powder G with the exception that powder of $Sr_{0.2}Zr_{0.8}O_2$ was used in place of the powder of $Ca_{0.2}Zr_{0.8}O_2$.

Powder K was prepared by repeating the same operation as that for Powder G with the exception that powder $Ca_{0.1}Mg_{0.1}Zr_{0.8}O_2$ was used in place of the powder of $Ca_{0.2}Zr_{0.8}O_2$.

Powder L was prepared by repeating the same operation as that for Powder G with the exception that powder $Ca_{0.1}Ba_{0.05}Mg_{0.05}Zr_{0.8}O_2$ was used in place of the powder of $Ca_{0.2}Zr_{0.8}O_2$.

Powder M was prepared by repeating the same operation as that for Powder G with the exception that powder $Ca_{0.01}Zr_{0.99}O_2$ was used in place of the powder of $Ca_{0.2}Zr_{0.8}O_2$.

Powder N was prepared by repeating the same operation as that for Powder G with the exception that powder $Ca_{0.55}Zr_{0.45}O_2$ was used in place of the powder of $Ca_{0.2}Zr_{0.8}O_2$.

Preparation of Catalytic Powder of HC Oxidizing Layer

Powder of activated alumina ($Al_2O_3$) was impregnated with an aqueous solution of palladium (Pd) nitrate, followed by drying and firing, thereby preparing Pd-carried alumina powder O whose Pd concentration was 15% by weight.

Subsequently, powder P was prepared by repeating the same operation as that for powder O with the exception that powder of powder of activated alumina ($Al_2O_3$) containing 3% by weight of Ce was used in place of the powder of $Al_2O_3$.

Powder Q was prepared by repeating the same operation as that for powder O with the exception that powder of activated alumina ($Al_2O_3$) containing 3% by weight of Zr was used in place of the powder of $Al_2O_3$.

Powder R was prepared by repeating the same operation as that for powder O with the exception that powder of alumina ($Al_2O_3$) containing 3% by weight of La was used in place of the powder of $Al_2O_3$.

Powder S was prepared by repeating the same operation as that for powder O with the exception that powder of alumina ($Al_2O_3$) containing 10% by weight of Zr was used in place of the powder of $Al_2O_3$.

Preparation of Catalytic Powder of NOx Reducing Layer

Powder of activated alumina ($Al_2O_3$) was impregnated with an aqueous solution of palladium (Pd) nitrate, followed by drying and firing, thereby preparing Pd-carried alumina powder T whose Pd concentration was 8% by weight.

Powder of activated alumina ($Al_2O_3$) was impregnated with an aqueous solution of dinitrodiammine platinum, followed by drying and firing, thereby preparing Pt-carried alumina powder U whose Pt concentration was 6% by weight.

Powder of activated alumina ($Al_2O_3$) was impregnated with an aqueous solution of rhodium (Rh) nitrate, followed by drying and firing, thereby preparing Rh-carried alumina powder V whose Rh concentration was 4% by weight.

Example 1

Preparation of Catalyst

β-Zeolite (Si/2Al=25) in an amount of 900 g was mixed with 100 g of silica sol and 1000 g of pure water, followed by pulverizing, thereby forming a slurry. The slurry was coated on a cordierite ceramic honeycomb-type monolithic substrate having a volume of 1.3 liters and 900 cells per square inch and having a thickness of walls (defining each cell) of 4 mil, so that the walls of the cells were coated with the slurry. The thus coated substrate was dried and then fired thereby to obtain a catalyst Z1 having 100 g of a zeolite coat per one liter of the monolithic substrate.

Subsequently, 706 g of the powder A, 14 g of nitric acid-acidic alumina binder and 800 g of pure water were mixed and pulverized thereby forming a slurry. The slurry was coated on the catalyst Z1, so that the walls of the cells were coated with the slurry. The thus coated catalyst was dried and fired thereby to obtain a catalyst A provided with a coat formed on the catalyst Z1 and having a weight of 72 g per one liter of the monolithic substrate. The catalyst A carried 7.06 g of Pd per one liter of the monolithic substrate.

Additionally, 588 g of the powder G, 12 g of nitric acid-acidic alumina binder and 600 g of pure water were mixed and pulverized thereby forming a slurry. The slurry was coated on the catalyst A, so that the walls of the cells were coated with the slurry. The thus coated catalyst was dried and fired thereby to obtain a catalyst AG1 (shown in Table 2) provided with a coat in an amount of 60 g per one liter of the monolithic substrate. The catalyst AG1 carried 3.53 g per one liter of the monolithic substrate. The catalyst AG1 took a three-layer structure as shown in FIG. 3.

In the column of "HC adsorbing layer" in Table 2, "β(Si/2Al=25)" indicates the fact that the HC adsorbing layer contained β-zeolite (having a Si/2Al ratio of 25). In the column of "First layer" in Table 2, "A" indicates the fact that the First layer contained the powder A. In the column of "Second layer" in Table 2, "G" indicates the fact that the Second layer contained the powder G.

Figure 3:
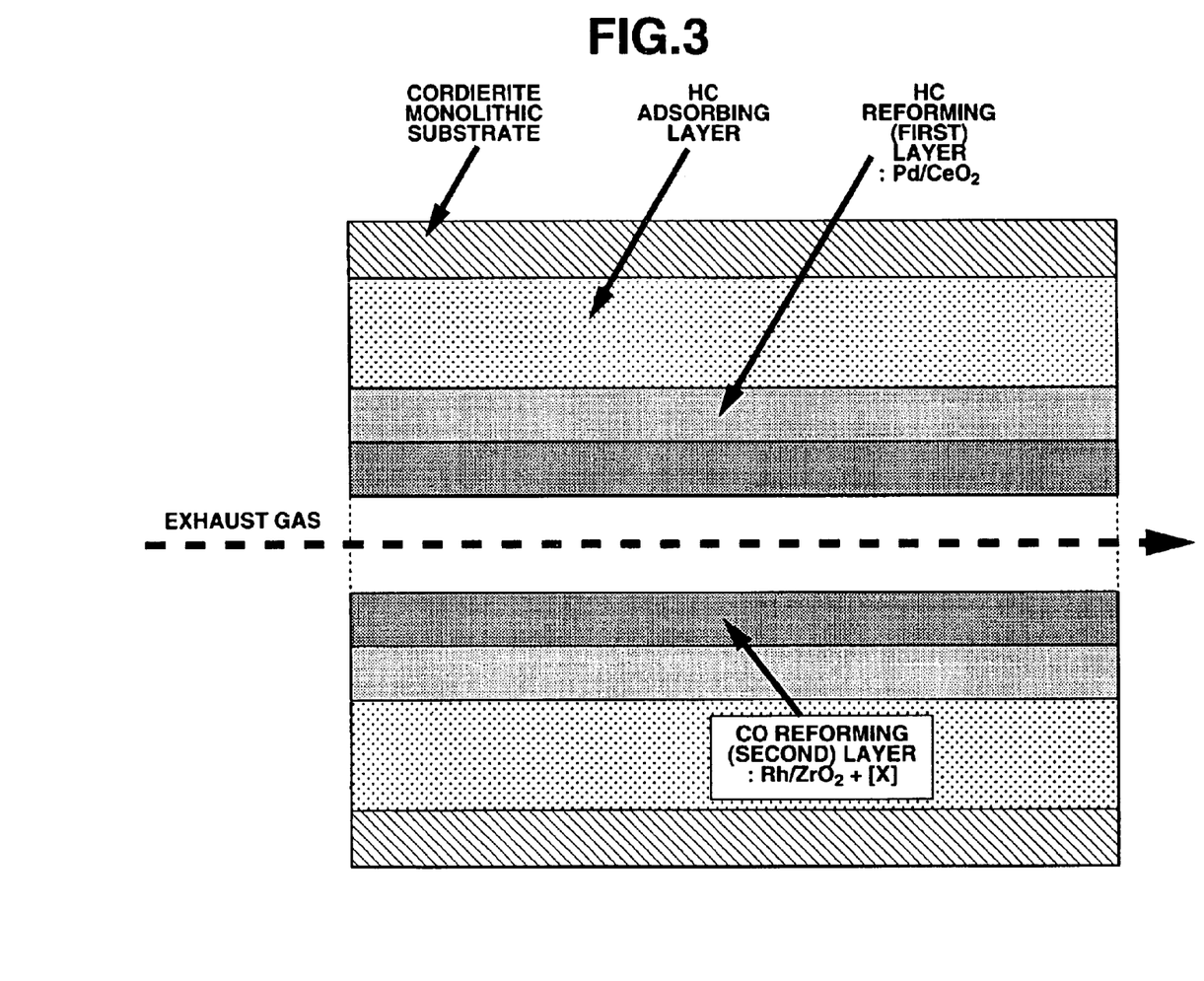
FIG. 3 is a fragmentary longitudinal sectional view of a further example of an exhaust gas purifying catalyst according to the present invention, showing a coat layer structure defining a cell through which exhaust gas flows, in connection of Examples.

The HC adsorbing layer, the First layer, the Second layer and the Third layer shown in Table 2 are correspondingly illustrated in FIG. 3.

Preparation of NOx Reducing Catalyst

The powder T in an amount of 618 g, 530 g of the powder U, 88 g of the powder V, 20 g of sodium hydroxide (calculated as $Na_2O$), 20 g of barium acetate (calculated as BaO), 14 g of nitric acid-acidic alumina binder and 1500 g of pure water were mixed, followed by pulverizing, thereby forming a slurry. This slurry was coated on a cordierite ceramic honeycomb-type monolithic substrate having a volume of 1.3 liters and 400 cells per square inch and having a thickness of walls (defining each cell) of 6 mil, so that the walls of the cells were coated with the slurry. The thus coated monolithic substrate was dried and fired thereby to obtain a catalyst N1 provided with a coat formed on the monolithic substrate and having a weight of 147 g per one liter of the monolithic substrate. The catalyst N1 carried 4.94 g of Pd, 3.18 g of Pt and 0.35 g of Rh per one liter of the monolithic substrate. The catalyst N1 took such a structure that a single layer of coat was formed on the monolithic substrate.

Construction of Exhaust Gas Purifying System

An exhaust gas purifying system of Example 1 was constructed by disposing the catalyst AG1 in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst AG1 and located at the position of the catalyst 2.

Examples 2 to 7

Preparation of Catalyst

Catalysts AG2, AG4, AG5, AG6 and AG7 (shown in Table 2) corresponding respectively to Examples 2, 3, 4, 5, 6 and 7 were obtained repeating the above preparation operation for the catalyst AG1 with the exception that β-zeolite (Si/2Al=25) was replaced with other HC adsorbing materials shown in Table 2, respectively.

In the column of "HC adsorbing layer" in Table 2, "β(Si/2Al=15)" indicates the fact that the HC adsorbing layer contained β-zeolite (having a Si/2Al ratio of 159; "β(Si/2Al=300)" indicates the fact that the HC adsorbing layer contained β-zeolite (having a Si/2Al ratio of 300); "β(Si/2Al 25)+MFI (=30)" indicates the fact that the HC adsorbing layer contained a mixture of β-zeolite (having a Si/2Al ratio of 25) and MFI (having a Si/2Al ratio of 30); "β(=25)+USY(=15)" indicates the fact that the HC adsorbing layer contained a mixture of β-zeolite (having a Si/2Al ratio of 26) and USY-type zeolite having a Si/2Al ratio of 15); "Ag, P-β(=25)" indicates the fact that the HC adsorbing layer contained β-zeolite (having a Si/2A1 ratio of 25) containing and P; and "Pd-β(=25)" indicates the fact that the HC adsorbing layer contained β-zeolite (having a Si/2Al ratio of 25) containing.

Construction of Exhaust Gas Purifying System

Each of exhaust gas purifying systems of Examples 2, 3, 4, 6, 6 and 7 was constructed by disposing the catalyst AG2, AG3, AG4, AG5, AG6 or AG7 in the exhaust gas passageway 10a extending from the internal combustion engine 10 and located at the position of the catalyst 1, as shown in FIG. 6. Additionally, the (NOx reducing catalyst) N1 was disposed in the exhaust gas passageway 10a downstream of the catalyst AG2, AG3, AG4, AG5, AG6 or AG7 and located at the position of the catalyst 2.

Example 8

Preparation of Catalyst

β-Zeolite (Si/2Al=25) in an amount of 900 g was mixed with 100 g of silica sol and 1000 g of pure water, followed by pulverizing, thereby forming a slurry. The slurry was coated on a cordierite ceramic honeycomb-type monolithic substrate having a volume of 1.3 liters and 900 cells per square inch and having a thickness of walls (defining each cell) of 4 mil, so that the walls of the cells were coated with the slurry. The thus coated substrate was dried and then fired thereby to obtain a catalyst Z1 having 100 g of a zeolite coat per one liter of the monolithic substrate.

Subsequently, 706 g of the powder B, 14 g of nitric acid-acidic alumina binder and 800 g of pure water were mixed and pulverized thereby forming a slurry. The slurry was coated on the catalyst Z1, so that the walls of the cells were coated with the slurry. The thus coated catalyst was dried and fired thereby to obtain a catalyst B provided with a coat formed on the catalyst Z1 and having a weight of 72 g per one liter of the monolithic substrate. The catalyst B carried 7.06 g of Pd per one liter of the monolithic substrate.

Additionally, 588 g of the powder G, 12 g of nitric acid-acidic alumina binder and 600 g of pure water were mixed and pulverized thereby forming a slurry. The slurry was coated on the catalyst B, so that the walls of the cells were coated with the slurry. The thus coated catalyst was dried and fired thereby to obtain a catalyst BG (shown in Table 2) at in an amount of 60 g per one liter of the monolithic substrate. The catalyst BG carried 3.53 g per one liter of the monolithic substrate. The catalyst BG took a three-layer structure as shown in FIG. 3.

In the column of "HC adsorbing layer" in Table 2, "β(=25)" indicates the fact that the HC adsorbing layer contained β-zeolite (having a Si/2Al ratio of 25).

Construction of Exhaust Gas Purifying System

An exhaust gas purifying system of Example 8 was constructed by disposing the catalyst BG in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst BG and located at the position of the catalyst 2.

Examples 9 to 12

Preparation of Catalyst

Catalysts CG, DG, EG and FG (shown in Table 2) corresponding respectively to Examples 9, 10, 11 and 12 were obtained repeating the above preparation operation for the catalyst BG with the exception that the powder B was replaced with other powders shown in Table 2, respectively.

Construction of Exhaust Gas Purifying System

Each of exhaust gas purifying systems of Examples 9, 10, 11 and 12 (shown in Table 2) was constructed by disposing the catalyst CG, DG, EG or FG in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst CG, DG, EG or FG and located at the position of the catalyst 2.

Example 13

Preparation of Catalyst

β-Zeolite (Si/2Al=25) in an amount of 900 g was mixed with 100 g of silica sol and 1000 g of pure water, followed by pulverizing, thereby forming a slurry. The slurry was coated on a cordierite ceramic honeycomb-type monolithic substrate having a volume of 1.3 liters and 900 cells per square inch and having a thickness of walls (defining each cell) of 4 mil, so that the walls of the cells were coated with the slurry. The thus coated substrate was dried and then fired thereby to obtain a catalyst Z1 having 100 g of a zeolite coat per one liter of the monolithic substrate.

Subsequently, 706 g of the powder B, 706 g of the powder A, 28 g of nitric acid-acidic alumina binder and 1500 g of pure water were mixed and pulverized thereby forming a slurry. The slurry was coated on the catalyst Z1, so that the walls of the cells were coated with the slurry. The thus coated catalyst was dried and fired thereby to obtain a catalyst BA provided with a coat formed on the catalyst Z1 and having a weight of 144 g per one liter of the monolithic substrate. The catalyst BA carried 14.12 g of Pd per one liter of the monolithic substrate.

Additionally, 588 g of the powder H, 12 g of nitric acid-acidic alumina binder and 600 g of pure water were mixed and pulverized thereby forming a slurry. The slurry was coated on the catalyst BA, so that the walls of the cells were coated with the slurry. The thus coated catalyst was dried and fired thereby to obtain a catalyst BAH (shown in Table 2) provided with a coat formed on the catalyst BA and having a weight of 60 g per one liter of the monolithic substrate. The catalyst BAH carried 3.53 g per one liter of the monolithic substrate. The catalyst BAH took a three-layer structure as shown in FIG. 3.

In the column of "First layer" in Table 2, "B+A" indicates the fact that the First layer contained a mixture of the powders B and A.

Construction of Exhaust Gas Purifying System

An exhaust gas purifying systems of Example 13 was constructed by disposing the catalyst BAH in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst BAH and located at the position of the catalyst 2.

Examples 14 to 19

Preparation of Catalyst

Catalysts BAI, BAJ, BAK, BAL, BAM and BAN (shown in Table 2) corresponding respectively to Examples 14, 15, 16, 17, 18 and 19 were obtained repeating the above preparation operation for the catalyst BAH with the exception that β-zeolite (Si/Al=25) and the powder H were replaced with other HC adsorbing materials and other powders shown in Table 2, respectively.

Construction of Exhaust Gas Purifying System

Each of exhaust gas purifying systems of Examples 14, 15, 16, 17, 18 and 19 was constructed by disposing the catalyst BAI, BAJ, BAK, BAL, BAM or BAN in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst BAI, BAJ, BAK, BAL, BAM or BAN and located at the position of the catalyst 2.

Example 20

Preparation of Catalyst

β-Zeolite (Si/2Al=26) in an amount of 900 g was mixed with 100 g of silica sol and 1000 g of pure water, followed by pulverizing, thereby forming a slurry. The slurry was coated on a cordierite ceramic honeycomb-type monolithic substrate having a volume of 1.3 liters and 900 cells per square inch and having a thickness of walls (defining each cell) of 4 mil, so that the walls of the cells were coated with the slurry. The thus coated substrate was dried and then fired thereby to obtain a catalyst Z2 having 50 g of a zeolite coat per one liter of the monolithic substrate.

Then, 471 g of the powder O, 9 g of nitric acid-acidic alumina binder and 500 g of pure water were mixed and pulverized thereby forming a slurry. The slurry was coated on an upstream section of the catalyst Z2, so that the walls of the cells were coated with the slurry to form an upstream layer. The upstream section was located upstream relative to flow direction of exhaust gas to be flown through the cells, and had a length of ¼ of the total length of the monolithic substrate. The catalyst Z2 was dried and fired thereby to obtain a catalyst O1 provided with a coat formed on the catalyst Z2 and having a weight of 48 g per one liter of the monolithic substrate. The catalyst O1 carried 7.06 g of Pd per one liter of the monolithic substrate.

Subsequently, 706 g of the powder B, 706 g of the powder A, 28 g of nitric acid-acidic alumina binder and 1000 g of pure water were mixed and pulverized thereby forming a slurry. The slurry was coated on a downstream section of the catalyst O1, so that the walls of the cells were coated with the slurry. The upstream section was located downstream of the upstream section relative to the flow direction of exhaust gas to be flown through the cells, and had a length of ¾ of the total length of the monolithic substrate. The thus coated catalyst was dried and fired thereby to obtain a catalyst OBA provided with a coat formed on the downstream section of the catalyst O1 and having a weight of 144 g per one liter of the monolithic substrate. The catalyst OBA carried totally 21.18 g of Pd per one liter of the monolithic substrate.

Additionally, 588 g of the powder L, 12 g of nitric acid-acidic alumina binder and 600 g of pure water were mixed and pulverized thereby forming a slurry. The slurry was coated on the downstream side of the catalyst OBA, so that the walls of the cells were coated with the slurry. The thus coated catalyst was dried and fired thereby to obtain a catalyst OBAL (shown in Table 2) provided with a coat formed on the catalyst OBA and having a weight of 60 g per one liter of the monolithic substrate. The catalyst OBAL carried 3.53 g of Rh per one liter of the monolithic substrate. The catalyst OBAL took a structure as shown in FIG. 4.

In the column of "Second layer" in Table 2, "B+A" indicates the fact that the Second layer contained a mixture of the powder B and the powder A. In the column of "Third layer" in Table 2, "L" indicates the fact that the Third layer contained the powder L.

Figure 4:
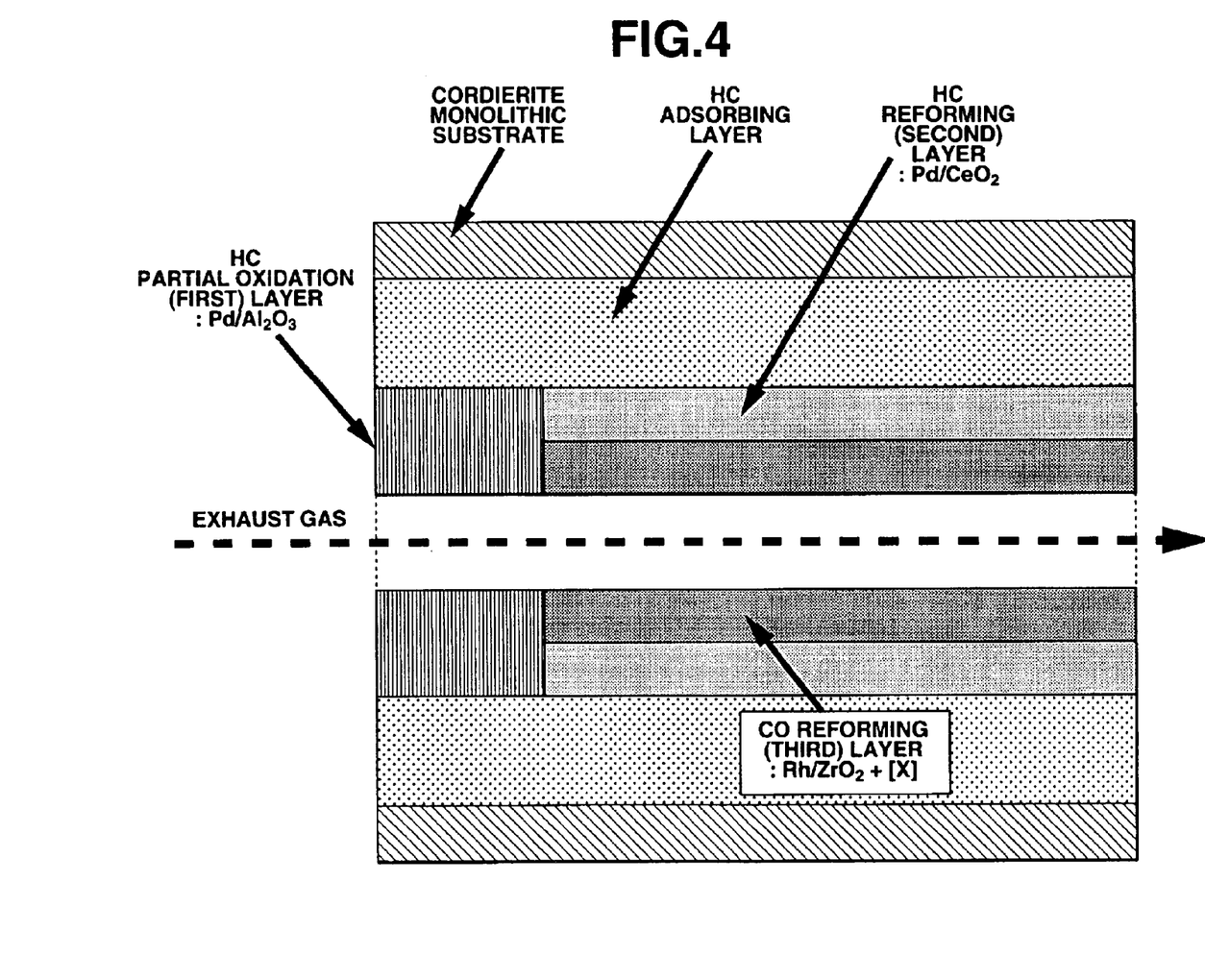
FIG. 4 is a fragmentary longitudinal sectional view of a still further example of an exhaust gas purifying catalyst according to the present invention, showing a coat layer structure defining a cell through which exhaust gas flows, in connection of Examples.

The HC adsorbing layer, the First layer, the Second layer and the Third layer shown in Table 2 are correspondingly illustrated in FIG. 4.

Construction of Exhaust Gas Purifying System

An exhaust gas purifying systems of Example 20 was constructed by disposing the catalyst OBAL in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst OBAL and located at the position of the catalyst 2.

Examples 21 to 25

Preparation of Catalyst

Catalysts PBBK, QBCJ, RBDI, SBEH and OBFG (shown in Table 2) corresponding respectively to Examples 21, 22, 23, 24 and 25 were obtained repeating the above preparation operation for the catalyst BAH with the exception that β-zeolite (Si/2Al=25), the powder O (in the first layer), the powders B and A (in the second layer) and/or the powder L (in the third layer) were replaced with other HC adsorbing materials and other powders shown in Table 2, respectively.

In the column of "Second layer" in Table 2, "2×B" indicates the fact that the Second layer contained two the powder B of an amount of two times of that in the catalyst OBAL was contained in the Second layer.

Construction of Exhaust Gas Purifying System

Each of exhaust gas purifying systems of Examples 21 to 25 was constructed by disposing the catalyst PBBK to OBFG in the exhaust gas passageway 10a extending from the internal combustion engine 10 and located at the position of the catalyst 1, as shown in FIG. 6. Additionally, the (NOx reducing) catalyst N1 was disposed in the exhaust gas passageway 10a downstream of the catalyst PBBK to OBFG and located at the position of the catalyst 2.

Example 26
Preparation of Catalyst

β-Zeolite (Si/2Al=25) in an amount of 900 g was mixed with 100 g of silica sol and 1000 g of pure water, followed by pulverizing, thereby forming a slurry. The slurry was coated on a cordierite ceramic honeycomb-type monolithic substrate having a volume of 1.3 liters and 900 cells per square inch and having a thickness of walls (defining each cell) of 4 mil, so that the walls of the cells were coated with the slurry. The thus coated substrate was dried and then fired thereby to obtain a catalyst Z2 having 50 g of a zeolite coat per one liter of the monolithic substrate.

Then, 706 g of the powder B and 14 g of nitric acid-acidic alumina binder and 1000 g of pure water were mixed and pulverized thereby forming a slurry. The slurry was coated on the catalyst Z2, so that the walls of the cells were coated with the slurry. The thus coated catalyst Z2 was dried and fired thereby to obtain a catalyst B2 provided with a coat formed on the catalyst Z2 and having a weight of 72 g per one liter of the monolithic substrate. The catalyst B2 carried 7.06 g of Pd per one liter of the monolithic substrate.

Subsequently, 588 g of the powder G, 12 g of nitric acid-acidic alumina binder and 600 g of pure water were mixed and pulverized thereby forming a slurry. The slurry was coated on the catalyst B2, so that the walls of the cells were coated with the slurry. The thus coated catalyst was dried and fired thereby to obtain a catalyst BG provided with a coat formed on the catalyst B2 and having a weight of 60 g per one liter of the monolithic substrate. The catalyst BG carried 3.53 g of Rh per one liter of the monolithic substrate.

Additionally, 618 g of the powder T, 530 g of the powder U, 88 g of the powder V, 20 g of sodium hydroxide (calculated as $Na_2O$), 20 g of barium acetate (calculated as BaO), 14 g of nitric acid-acidic alumina binder and 1500 g of pure water were mixed, followed by pulverizing, thereby forming a slurry. This slurry was coated on the catalyst BG, so that the walls of the cells were coated with the slurry. The thus coated catalyst was dried and fired thereby to obtain a catalyst BGN1 provided with a coat formed on the catalyst BG and having a weight of 147 g per one liter of the monolithic substrate. The catalyst BGN1 carried 12.0 g of Pd, 3.18 g of Pt and 3.88 g of Rh per one liter of the monolithic substrate. The catalyst BGN1 took a structure shown in FIG. 5.

Figure 5:
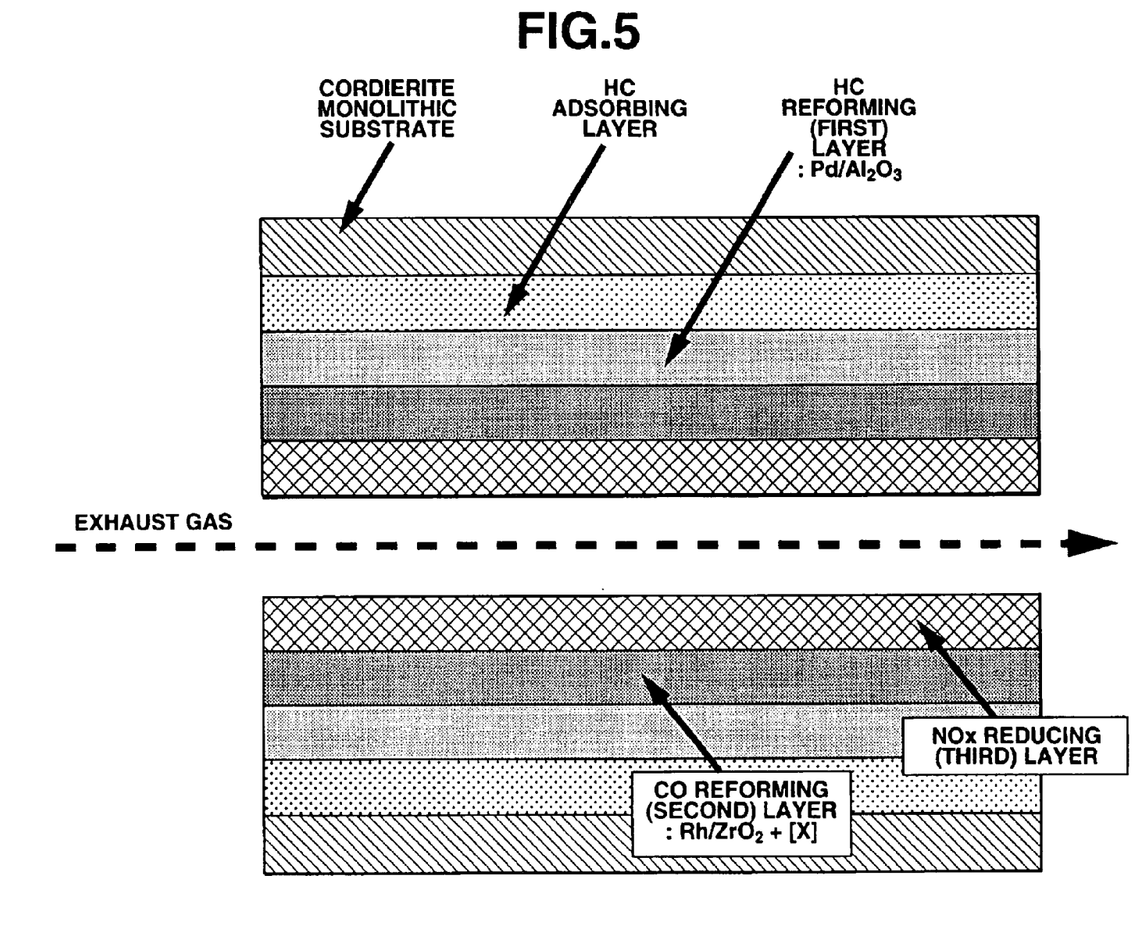
FIG. 5 is a fragmentary longitudinal sectional view of a still further example of an exhaust gas purifying catalyst according to the present invention, showing a coat layer structure defining a cell through which exhaust gas flows, in connection of Examples.

The HC adsorbing layer, the First layer, the Second layer and the Third layer shown in Table 2 are correspondingly illustrated in FIG. 5.

Construction of Exhaust Gas Purifying System

An exhaust gas purifying systems of Example 26 was constructed by disposing the catalyst BGN1 in the exhaust gas passageway 10*a* extending from the internal combustion engine 10 and located at the position of the catalyst 1, as shown in FIG. 6. Additionally, the (NOx reducing) catalyst N1 was disposed in the exhaust gas passageway 10*a* downstream of the catalyst BGN1 and located at the position of the catalyst 2.

Example 27
Preparation of NOx Reducing Catalyst

A (NOx reducing) catalyst N2 was obtained by repeating the above preparation operation for the catalyst N1 in Example 1 with the exception that sodium hydroxide was replaced with magnesium acetate, in which 10 g of MgO and 10 g of BaO were carried per one liter of the monolithic substrate.

Construction of Exhaust Gas Purifying System

An exhaust gas purifying systems of Example 27 was constructed by disposing the catalyst AG1 in the exhaust gas passageway 10*a* extending from the internal combustion engine 10 and located at the position of the catalyst 1, as shown in FIG. 6. Additionally, the NOx reducing catalyst N2 was disposed in the exhaust gas passageway 10*a* downstream of the catalyst AG1 and located at the position of the catalyst 2.

Example 28
Construction of Exhaust Gas Purifying System

An exhaust gas purifying systems of Example 28 was constructed by disposing the catalyst BGN1 in the exhaust gas passageway 10*a* extending from the internal combustion engine 10 and located at the position of the catalyst 1, as shown in FIG. 6. Additionally, the NOx reducing catalyst N2 was disposed in the exhaust gas passageway 10*a* downstream of the catalyst BA1 and located at the position of the catalyst 2.

Example 29
Construction of Exhaust Gas Purifying System

An exhaust gas purifying systems of Example 29 was constructed by disposing the catalyst BAH in the exhaust gas passageway 10*a* extending from the internal combustion engine 10 and located at the position of the catalyst 1, as shown in FIG. 6. Additionally, the NOx reducing catalyst N2 was disposed in the exhaust gas passageway 10*a* downstream of the catalyst BAH and located at the position of the catalyst 2.

Example 30
Construction of Exhaust Gas Purifying System

An exhaust gas purifying systems of Example 30 was constructed by disposing the catalyst OBFG in the exhaust gas passageway 10*a* extending from the internal combustion engine 10 and located at the position of the catalyst 1, as shown in FIG. 6. Additionally, the NOx reducing catalyst N2 was disposed in the exhaust gas passageway 10*a* downstream of the catalyst OBFG and located at the position of the catalyst 2.

Comparative Example 1
Preparation of Three-Way Catalyst

The powder T in an amount of 5665 g, 226 g of the powder F, 10 g of barium acetate (calculated as BaO), 9 g of nitric acid-acidic alumina binder and 1000 g of pure water were mixed, followed by pulverizing, thereby forming a slurry. This slurry was coated on a cordierite ceramic honeycomb-type monolithic substrate having a volume of 1.3 liters and 900 cells per square inch and having a thickness of walls (defining each cell) of 2 mil, so that the walls of the cells were coated with the slurry. The thus coated monolithic substrate was dried and fired thereby to obtain a catalyst T0 provided with a coat formed on the monolithic substrate and having a weight of 90 g per one liter of the monolithic substrate.

Subsequently, 128 g of the powder V, 200 g of $Ce_{0.2}Zr_{0.5}O_2$ powder, 12 g of nitric acid-acidic alumina binder and 500 g of pure water were mixed, followed by pulverizing, thereby forming a slurry. This slurry was coated on the catalyst T0 so that the walls of the cells were coated with the slurry, followed by drying and firing, thereby to obtain a catalyst T1 provided with a coat formed on the catalyst T0 and having a weight of 34 g per one liter of the monolithic substrate. The catalyst T1 carried 5.65 g of Pd and 0.51 g of Rh per one liter of the monolithic substrate. The catalyst T1 took such a structure in which two layers of coat were formed on the monolithic substrate.

Construction of Exhaust Gas Purifying System

An exhaust gas purifying systems of Comparative Example 1 was constructed by disposing the catalyst T1 in the exhaust gas passageway 10a extending from the internal combustion engine 10 and located at the position of the catalyst 1, as shown in FIG. 6. Additionally, the NOx reducing catalyst N1 was disposed in the exhaust gas passageway 10a downstream of the catalyst T1 and located at the position of the catalyst 2.

Evaluation Of Performance of Exhaust Gas Purifying Catalyst

Evaluation test (for emission performance) was conducted on the exhaust gas purifying systems of Examples and Comparative Examples, using an evaluation engine system as shown in FIG. 6. For the evaluation test, each exhaust gas purifying system was incorporated in the evaluation engine system including the engine which was a cylinder direct injection internal combustion engine having a displacement of 1.8 liters and produced by Nissan Motor Co., Ltd.

Prior to the evaluation test, the catalysts (corresponding to the catalyst 1 in FIG. 6) of Examples and Comparative Example underwent a durability test in which each catalyst was connected to an internal combustion engine produced by Nissan Motor Co., Ltd. In the durability test, the engine was operated under the following test conditions:

Displacement of the engine: 3,000 cc;

Fuel: "Nisseki Dasshu Gasoline" produced by Nippon Oil Co., Ltd. and having a Pb content of 0 mg/usg (US gallon) and a S content of not more than 30 ppm;

Temperature of gas to be supplied to the catalyst: 650° C.; and

Time of operation of the engine: 50 hours.

Then, the catalyst 1 undergone the durability test was subjected to the emission performance evaluation test conducted under a test mode "FTP-75 (LA-4) mode" employed in the Unites States of America. In this test, the exhaust gas purifying system was incorporated in the evaluation engine system of FIG. 6, in the catalyst 1 was installed at its predetermined position shown in FIG. 6. The engine was arranged such that fuel was directly injected into each cylinder. In the emission performance evaluation test, the catalyst 1 and the catalyst 2 had the following volumes:

Catalyst 1: 1.3 liters

Catalyst 2: 1.3 liters.

In the emission performance evaluation test, a concentration A of gas components (HC, CO and NOx) in exhaust gas from the engine in a state where no exhaust gas purifying system was provided was measured, and a concentration B in exhaust gas emitted from the catalyst 2 (NOx reducing catalyst) in FIG. 6 was measured, thereby obtaining a "remaining rate (%)" of the gas components, shown in Table 3. The remaining rate (%) was calculated by [(the concentration B of the gas component/the concentration A of the gas component)×100], in which the concentrations were measured as "ppm".

As apparent from the above, according to the present invention, by virtue of the catalytic layer for functioning to produce hydrogen ($H_2$), the produced hydrogen is used as reducing agent. As a result, the catalyst of the present invention can reduce and remove NOx in exhaust gas at a high efficiency under the oxygen-excessive atmosphere of exhaust gas and effectively removing HC and CO particularly during a low temperature engine operation immediately after engine starting, while obtaining a high fuel economy improvement effect upon making lean-burn operation of the engine.

The entire contents of Japanese Patent Applications P11-336839 (filed Nov. 26, 1999) and P2000-342550 (filed Nov. 9, 2000) are incorporated herein by reference.

Although the invention has been described above by reference to certain embodiments of the invention, the invention is not limited to the embodiments and examples described above. Modifications and variations of the embodiments and examples described above will occur to those skilled in the art, in light of the above teachings. The scope of the invention is defined with reference to the following claims.

INDUSTRIAL APPLICABILITY

As discussed above, the exhaust gas purifying catalyst according to the present invention can be applied to reduce and remove NOx in exhaust gas at a high efficiency under the oxygen-excessive atmosphere of exhaust gas and effectively removing HC and CO, maintaining a high fuel economy improvement effect under lean-burn operation.

TABLE 1

| Powder (catalyst component) | Metal carried | | Carrier |
|---|---|---|---|
| | Kind | Concentration (%) | |
| A | Pd | 10.0 | $CeO_2$ |
| B | Pd | 10.0 | $Zr_{0.1}Ce_{0.9}O_2$ |
| C | Pd | 10.0 | $Zr_{0.2}Ce_{0.8}O_2$ |
| D | Pd | 10.0 | $Zr_{0.5}Ce_{0.5}O_2$ |
| E | Pd | 10.0 | $Zr_{0.9}Ce_{0.1}O_2$ |
| F | Pd | 5.0 | $CeO_2$ |
| G | Rh | 6.0 | $Ca_{0.2}Zr_{0.8}O_2$ |
| H | Rh | 6.0 | $Mg_{0.1}Zr_{0.9}O_2$ |
| I | Rh | 6.0 | $Ba_{0.1}Zr_{0.9}O_2$ |
| J | Rh | 6.0 | $Sr_{0.2}Zr_{0.8}O_2$ |
| K | Rh | 6.0 | $Ca_{0.1}Mg_{0.1}Zr_{0.8}O_2$ |
| L | Rh | 6.0 | $Ca_{0.1}Ba_{0.05}Mg_{0.05}Zr_{0.8}O_2$ |
| M | Rh | 6.0 | $Ca_{0.01}Zr_{0.99}O_2$ |
| N | Rh | 6.0 | $Ca_{0.5}Zr_{0.5}O_2$ |
| O | Pd | 15.0 | $Al_2O_3$ |
| P | Pd | 15.0 | Ce(3 wt. %) - $Al_2O_3$ |
| Q | Pd | 15.0 | Zr(3 wt. %) - $Al_2O_3$ |
| R | Pd | 15.0 | La(3 wt. %) - $Al_2O_3$ |
| S | Pd | 15.0 | Zr(10 wt. %) - $Al_2O_3$ |
| T | Pd | 8.0 | $Al_2O_3$ |
| U | Pt | 6.0 | $Al_2O_3$ |
| V | Rh | 4.0 | $Al_2O_3$ |

TABLE 2

| Catalyst | Structure of catalyst | Substance carried | | | | | | | | |
|---|---|---|---|---|---|---|---|---|---|---|
| | | Pd | Pt | Rh | Alkali metal oxide | Alkaline earth metal oxide | HC adsorbing layer | First layer | Second layer | Third layer |
| AG1 | FIG. 3 | 7.06 | — | 3.53 | — | — | β(Si/2Al = 25) | A | G | — |
| AG2 | FIG. 3 | 7.06 | — | 3.53 | — | — | β(Si/2Al = 15) | A | G | — |

TABLE 2-continued

| Catalyst | Structure of catalyst | Pd | Pt | Rh | Alkali metal oxide | Alkaline earth metal oxide | HC adsorbing layer | First layer | Second layer | Third layer |
|---|---|---|---|---|---|---|---|---|---|---|
| AG3 | FIG. 3 | 7.06 | — | 3.53 | — | — | β(Si/2Al = 300) | A | G | — |
| AG4 | FIG. 3 | 7.06 | — | 3.53 | — | — | β(=25) + MFI(=30) | A | G | — |
| AG5 | FIG. 3 | 7.06 | — | 3.53 | — | — | β(=25) + USY(=15) | A | G | — |
| AG6 | FIG. 3 | 7.06 | — | 3.53 | — | — | Ag,P – β(=25) | A | G | — |
| AG7 | FIG. 3 | 7.06 | — | 3.53 | — | — | Pd – β(=25) | A | G | — |
| BG | FIG. 3 | 7.06 | — | 3.53 | — | — | β(=25) | B | G | — |
| CG | FIG. 3 | 7.06 | — | 3.53 | — | — | β(=25) | C | G | — |
| DG | FIG. 3 | 7.06 | — | 3.53 | — | — | β(=25) | D | G | — |
| EG | FIG. 3 | 7.06 | — | 3.53 | — | — | β(=25) | E | G | — |
| FG | FIG. 3 | 7.06 | — | 3.53 | — | — | β(=25) | F | G | — |
| BAH | FIG. 3 | 14.12 | — | 3.53 | — | — | β(=25) | B + A | H | — |
| BAI | FIG. 3 | 14.12 | — | 3.53 | — | — | β(=25) | B + A | I | — |
| BAJ | FIG. 3 | 14.12 | — | 3.53 | — | — | β(=25) | B + A | J | — |
| BAK | FIG. 3 | 14.12 | — | 3.53 | — | — | β(=25) + MFI(=30) | B + A | K | — |
| BAL | FIG. 3 | 14.12 | — | 3.53 | — | — | β + USY(=15) | B + A | L | — |
| BAM | FIG. 3 | 14.12 | — | 3.53 | — | — | Ag,P – β(=25) | B + A | M | — |
| BAN | FIG. 3 | 14.12 | — | 3.53 | — | — | Pd – β(=25) | B + A | N | — |
| OBAL | FIG. 4 | 21.18 | — | 3.53 | — | — | β(=25) | O | B + A | L |
| PBBK | FIG. 4 | 21.18 | — | 3.53 | — | — | β(=25) | P | 2 × B | K |
| QBCJ | FIG. 4 | 21.18 | — | 3.53 | — | — | β(=25) + MFI(=30) | Q | B + C | J |
| RBDI | FIG. 4 | 21.18 | — | 3.53 | — | — | β(=25) + USY(=15) | R | B + D | I |
| SBEH | FIG. 4 | 21.18 | — | 3.53 | — | — | Ag,P – β(=25) | S | B + E | H |
| OBFG | FIG. 4 | 21.18 | — | 3.53 | — | — | Pd – β(=25) | O | B + F | G |
| BGN1 | FIG. 5 | 12.0 | 3.18 | 3.88 | (Na$_2$O)2 | (BaO)20 | β(=25) | B | G | T + U + V |
| N1 | Single layer | 4.94 | 3.18 | 0.35 | (Na$_2$O)2 | (BaO)20 | | | | |
| N2 | Single layer | 4.94 | 3.18 | 0.35 | (MgO)10 | (BaO)10 | | | | |
| T1 | Two layers | 5.65 | — | 0.51 | — | (BaO)10 | | | | |

TABLE 3

| | Installation position | | Remaining rate (%) | | |
|---|---|---|---|---|---|
| | Catalyst 1 | Catalyst 2 | HC | CO | NOx |
| Example 1 | AG1 | N1 | 1.3 | 1.9 | 2.4 |
| Example 2 | AG2 | N1 | 1.2 | 1.8 | 2.2 |
| Example 3 | AG3 | N1 | 1.1 | 1.7 | 2.1 |
| Example 4 | AG4 | N1 | 1.1 | 1.8 | 1.9 |
| Example 5 | AG5 | N1 | 1.2 | 1.8 | 2.0 |
| Example 6 | AG6 | N1 | 1.2 | 1.7 | 2.0 |
| Example 7 | AG7 | N1 | 1.2 | 1.8 | 2.1 |
| Example 8 | BG | N1 | 1.2 | 1.7 | 1.9 |
| Example 9 | CG | N1 | 1.3 | 1.6 | 2.1 |
| Example 10 | DG | N1 | 1.3 | 1.6 | 2.2 |
| Example 11 | EG | N1 | 1.2 | 1.7 | 2.0 |
| Example 12 | FG | N1 | 1.2 | 1.8 | 2.1 |
| Example 13 | BAH | N1 | 1.1 | 1.9 | 1.9 |
| Example 14 | BAI | N1 | 1.1 | 1.8 | 1.9 |
| Example 15 | BAJ | N1 | 1.1 | 1.8 | 2.0 |
| Example 16 | BAK | N1 | 1.2 | 1.8 | 2.0 |
| Example 17 | BAL | N1 | 1.1 | 1.9 | 2.1 |
| Example 18 | BAM | N1 | 1.2 | 1.8 | 2.1 |
| Example 19 | BAN | N1 | 1.3 | 1.8 | 2.2 |
| Example 20 | OBAL | N1 | 1.4 | 2.0 | 2.2 |
| Example 21 | PBBK | N1 | 1.2 | 1.8 | 2.1 |
| Example 22 | QBCJ | N1 | 1.1 | 1.9 | 1.9 |
| Example 23 | RBDI | N1 | 1.1 | 1.8 | 1.9 |
| Example 24 | SBEH | N1 | 1.1 | 1.8 | 2.0 |
| Example 25 | OBFG | N1 | 1.2 | 1.8 | 2.0 |
| Example 26 | BGN1 | N1 | 1.3 | 2.4 | 2.2 |
| Example 27 | AG1 | N2 | 1.2 | 1.7 | 2.0 |
| Example 28 | BG1 | N2 | 1.3 | 1.6 | 2.1 |
| Example 29 | BAH | N2 | 1.2 | 1.7 | 2.1 |
| Example 30 | OBFG | N2 | 1.1 | 1.8 | 2.0 |
| Comp. example 1 | T1 | N1 | 4.2 | 7.1 | 7.3 |

What is claimed is:

1. An exhaust gas purifying system for an internal combustion engine, comprising:

an exhaust gas purifying catalyst including a monolithic substrate, a HC adsorbing layer for adsorbing hydrocarbons (HC), said HC absorbing layer being formed on said monolithic substrate, and a catalytic layer for producing hydrogen (H$_2$) and reducing NOx, said catalytic layer functioning to produce hydrogen (H$_2$) from at least one of hydrocarbons and carbon monoxide (CO) and to reduce nitrogen oxides (NOx) with the produced hydrogen and at least one of hydrocarbons and carbon monoxide in exhaust gas, said catalytic layer being formed on said HC adsorbing layer; and a device for controlling combustion in the engine to produce exhaust gas, to be brought into contact with said catalytic layer, having a composition meeting a relation [(a concentration of hydrogen/a concentration of total reducing components)≧0.3].

2. An exhaust gas purifying system for an internal combustion engine as claimed in claim 1, wherein said exhaust gas purifying catalyst is for purifying exhaust gas discharged from an internal combustion engine, wherein said HC adsorbing layer contains zeolite and functions to adsorb hydrocarbons during a cold operation of the engine and to release adsorbed hydrocarbons during a warm-up operation of the engine, wherein said catalytic layer functions to produce hydrogen from hydrocarbons released from said HC adsorbing layer and from at least one of hydrocarbons and carbon monoxide discharged from the engine after the warm-up operation and to reduce NOx with produced hydrogen and at least hydrocarbons and carbon monoxide in exhaust gas.

3. An exhaust gas purifying system for an internal combustion engine as claimed in claim 1, wherein said catalytic layer contains a H$_2$ producing catalyst component for functioning to produce hydrocarbons, and a NOx reducing catalyst component for functioning to reduce nitrogen oxides, said H$_2$ producing catalyst component being disposed on said HC adsorbing layer and including a HC reforming catalyst component functioning to reform hydrocarbons so as to produce hydrogen and a CO reforming catalyst component functioning to make steam reforming of carbon monoxide, said HC reforming catalyst component containing cerium oxide carrying palladium, said CO reforming catalyst component containing zirconium oxide carrying rhodium.

4. An exhaust gas purifying system for an internal combustion engine as claimed in claim 3, wherein said catalytic layer further includes an upstream layer formed at an upstream section of said exhaust gas purifying catalyst, said upstream section being located upstream of said HC reforming catalyst component and said CO reforming catalyst component relative to flow direction of exhaust gas, said upstream layer containing alumina carrying palladium.

5. An exhaust gas purifying system for an internal combustion engine as claimed in claim 3, wherein said zirconium oxide carrying rhodium contains alkaline earth and has a composition represented by the following formula (A):

$$[X]_a Zr_b O_c \quad (A)$$

where X is an alkaline earth metal selected from the group consisting of magnesium, calcium, strontium and barium; a and b are ratios of atoms of elements; and c is a number of oxygen atoms required for satisfying valences of X and Zr, in which a is within a range of from 0.01 to 0.5, b is within a range of from 0.5 to 0.99, and a+b=1.0.

6. An exhaust gas purifying system for an internal combustion engine as claimed in claim 4, wherein said NOx reducing catalyst component functioning to reduce nitrogen oxides is contained in at least one of said HC adsorbing layer, said HC reforming catalyst component, said CO reforming catalyst component and said upstream layer containing alumina carrying palladium.

7. An exhaust gas purifying system for an internal combustion engine as claimed in claim 4, wherein said NOx reducing catalyst component functioning to reduce nitrogen oxides is contained in at least one of said HC adsorbing layer, said HC reforming catalyst component, said CO reforming catalyst component and said upstream layer containing alumina carrying palladium, said NOx reducing catalyst component containing at least one selected from the group consisting of palladium, platinum, rhodium, alumina, alkali metal and alkaline earth metal.

8. An exhaust gas purifying system for an internal combustion engine as claimed in claim 1, wherein said zeolite contains H-type β-zeolite having a Si/2Al ratio ranging from 10 to 500.

9. An exhaust gas purifying system for an internal combustion engine as claimed in claim 1, wherein said zeolite contains H-type β-zeolite and at least one of MFI, Y-type zeolite, USY-type zeolite and mordenite.

10. An exhaust gas purifying system for an internal combustion engine as claimed in claim 1, wherein said zeolite contains at least one selected from the group consisting of palladium, magnesium, calcium, strontium, barium, silver, yttrium, lanthanum, cerium, neodymium, phosphorus, boron and zirconium.

11. An exhaust gas purifying system for an internal combustion engine as claimed in claim 4, wherein said NOx reducing catalyst component functioning to reduce nitrogen oxides is contained in at least one of said HC adsorbing layer, said HC reforming catalyst component, said CO reforming catalyst component and said upstream layer containing alumina carrying palladium, said NOx reducing catalyst component containing at least one selected from the group consisting of alkali metal and alkaline earth metal, said NOx reducing catalyst component containing at least one selected from the group consisting of potassium, cesium, magnesium, calcium and barium.

12. An exhaust gas purifying system for an internal combustion engine as claimed in claim 3, wherein said HC reforming catalyst component and said CO reforming catalyst are mixed to form a single layer disposed on said monolithic substrate on said HC adsorbing layer.

13. An exhaust gas purifying system for an internal combustion engine as claimed in claim 3, wherein said HC reforming catalyst component forms a first layer disposed on said monolithic substrate, and said CO reforming catalyst forms a second layer, said second layer being formed on said first layer.

14. An exhaust gas purifying system for an internal combustion engine as claimed in claim 3, wherein said HC reforming catalyst component forms a first layer disposed on said monolithic substrate, and said CO reforming catalyst component forms a second layer, said second layer being formed downstream of said first layer relative to flow direction of exhaust gas.

15. A method comprising:
providing an exhaust gas purifying catalyst, the exhaust gas purifying catalyst comprising:
a monolithic substrate;
a HC adsorbing layer for adsorbing hydrocarbons (HC), said HC absorbing layer containing zeolite and being formed on said monolithic substrate; and
a catalytic layer for producing hydrogen ($H_2$) and reducing NOx, said catalytic layer functioning to produce hydrogen ($H_2$) from at least one of hydrocarbons and carbon monoxide (CO) and to reduce nitrogen oxides (NOx) with the produced hydrogen and at least one of hydrocarbons and carbon monoxide in exhaust gas, said catalytic layer being formed on said HC adsorbing layer; and
supplying exhaust gas to contact said catalytic layer, the exhaust gas having a composition meeting a relation [(a concentration of hydrogen/a concentration of total reducing components)≧0.3].

* * * * *